(No Model.) 3 Sheets—Sheet 3.
G. H. LASAR.
BAND CUTTER AND FEEDER.
No. 455,219. Patented June 30, 1891.
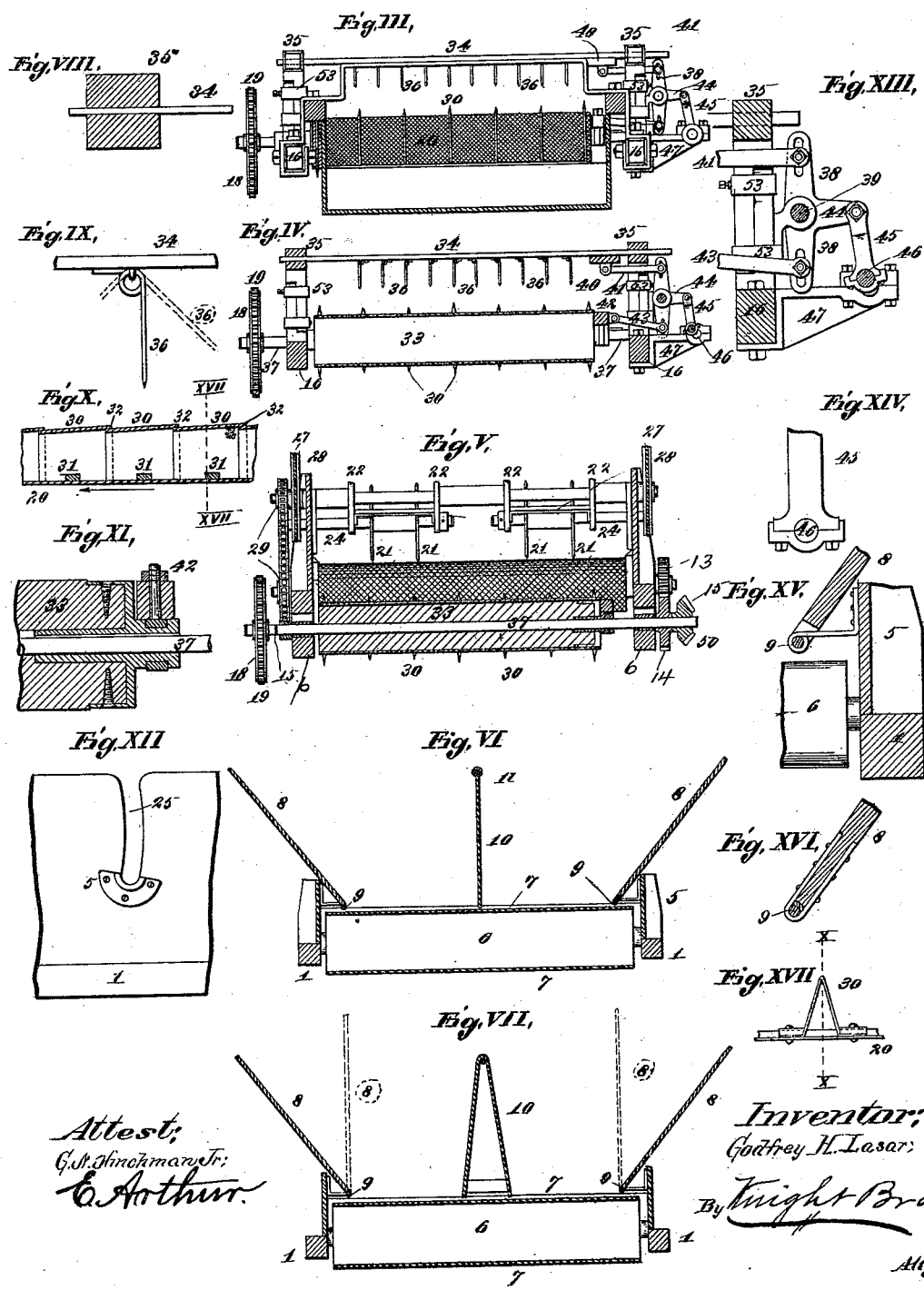
Attest:
G. H. Hinchman Jr.
E. Arthur.
Inventor:
Godfrey H. Lasar;
By Knight Bros
Attys.

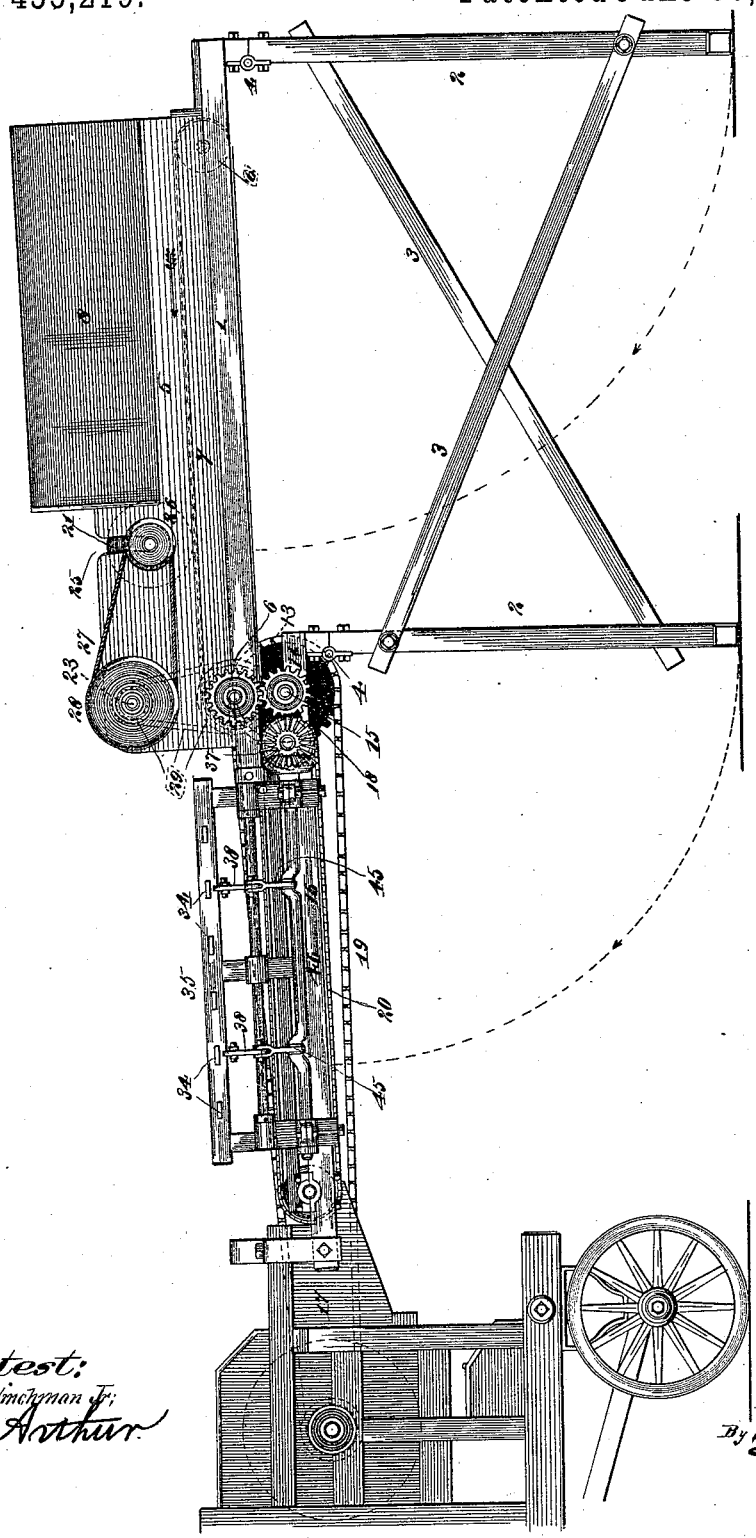

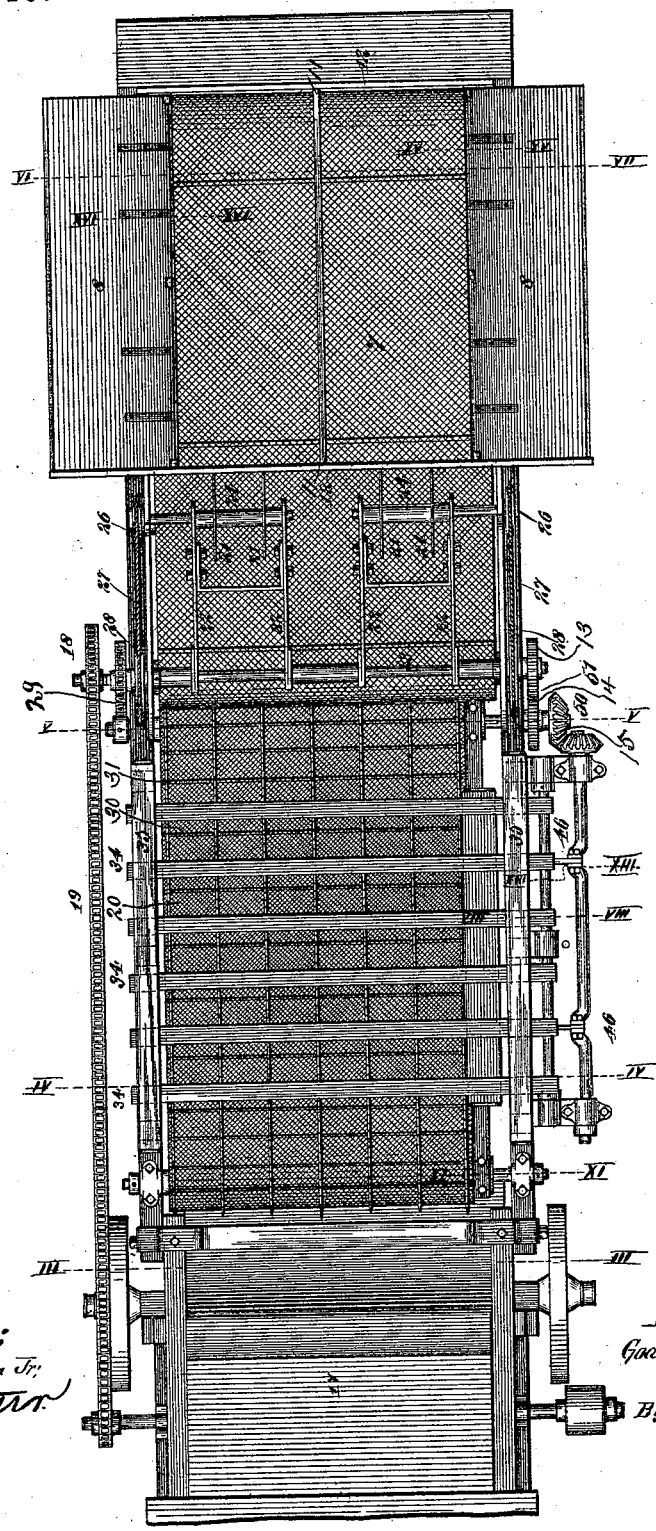

UNITED STATES PATENT OFFICE.

GODFREY H. LASAR, OF ST. LOUIS, MISSOURI.

BAND-CUTTER AND FEEDER.

SPECIFICATION forming part of Letters Patent No. 455,219, dated June 30, 1891.

Application filed July 8, 1889. Serial No. 316,828. (No model.)

*To all whom it may concern:*

Be it known that I, GODFREY H. LASAR, of the city of St. Louis, in the State of Missouri, have invented a certain new and useful Improvement in a Band-Cutter and Feeder, of which the following is a full, clear, and exact description, reference being had to the accompanying drawings, forming part of this specification, and in which—

Figure I is a side elevation of my improved device. Fig. II is a top or plan view. Fig. III is a transverse vertical section taken on line III III, Fig. II. Fig. IV is a similar view taken on line IV IV, Fig. II. Fig. V is a similar view taken on line V V, Fig. II. Figs. VI and VII are similar views taken on line VI VII, Fig. II, the latter illustrating a modification of the central partition. Fig. VII shows the central flap of V shape in transverse section. Fig. VIII is an enlarged detail vertical section taken on line VIII VIII, Fig. II. Fig. IX is an enlarged detail view of the agitating-rake. Fig. X is a detail section of one of the carrying-aprons. This section is taken on line X X, Fig. XVII. Fig. XI is an enlarged detail section taken on line XI XI, Fig. II. Fig. XII is an enlarged detail view of the box or casing containing the knives or cutters. Fig. XIII is an enlarged detail section taken on line XIII XIII, Fig. II. Fig. XIV is an enlarged detail view of the links shown in Fig. XIII. Fig. XV is an enlarged detail vertical section taken on line XV XV, Fig. II. Fig. XVI is a similar view taken on line XVI XVI, Fig. II. Fig. XVII is a detail section of one of the carrying-aprons taken on line XVII XVII, Fig. X.

My invention relates to certain improvements in devices for cutting bands and feeding the stuff to the cylinders of thrashing-machines; and this invention consists in features of novelty hereinafter fully described, and pointed out in the claims.

Referring to the drawings, 1 represents a frame supported on legs 2, connected by braces 3. The legs are hinged at 4, so that they can be folded, as shown by dotted lines, Fig. I, and thus economize space in transportation.

Secured to the frame 1 are side pieces 5, at the bottom of which are journaled drums 6, over which passes an endless apron 7. The apron moves in the direction indicated by the arrow in Fig. I. To the cradle formed of these side pieces are hinged at or near the surface of the apron wings or flaps 8, which may be folded over or above the apron to protect it when not in use. The hinges are shown at 9, Fig. VI. The object of these wings or flaps is to enlarge the size of the cradle, so that the sheaves can be readily thrown onto the apron 7. The wings can be folded to a greater or less inclination from the position shown in dotted lines, Fig. VII.

At the center of the cradle I prefer to place a partition 10, which I have shown hinged at 11 to cross-pieces 12. (See Figs. II and VI.) The object of this partition is to divide the sheaves thrown in on opposite sides of the cradle, so that they will not be liable to cross each other, or to rest upon each other and thus interfere with the working of the apparatus.

In Fig. VII I have shown the partition V-shaped in transverse section, and it may be either of this shape or a plain straight strip, as shown in Fig. VI.

Secured to the journal of one of the drums 6 is a pinion 13, engaged by a pinion 14 on a shaft 15, supported on a frame 16, joined to the end of the frame 1, and located between the frame 1 and the thrashing-machine 17. The shaft 15 is also provided with a sprocket-wheel 18, around which passes a chain 19, which forms a connection between the wheel 18 and the cylinder of the machine, as shown in Fig. 1. One of the drums 6 is thus driven from the cylinder of the machine and moves the apron 7 in the direction of the arrow, as stated. This apron carries the stuff forward and delivers it onto an apron 20, supported by the frame 16. As the sheaves are carried forward by the apron 7, the bands are severed by means of cutters 21. (See Figs. II and V.) These cutters are mounted on the free ends of two or more independent sections or frames 22, the other ends of the frames being mounted on a shaft 23 in such a manner that they each have an independent vertical yieldance. I have shown two sections or frames 22, each carrying two cutters 21; but more may be employed, if desirable. I have also shown the cutters in the form of disks mounted on shafts 24, journaled in the lower free ends of the frames 22, and which extend through slots 25 in the side pieces 5, Fig. I, and are provided on their outer ends with pulleys 26, (see Fig. II,) around which pass belts 27, connecting the pulleys 26 to pulleys 28 on the shaft 23. The shaft 23 is turned by a chain and sprocket connection 29 with the shaft 13. (See Fig. I.) It will thus be seen that the cutters will be revolved as the apron is moved, thus cutting the bands as the sheaves are carried forward. I do not, of course, confine myself to the use of two sets of cutters, nor to the use of two cutters in each set, as this may be varied.

As already stated, the apron 7 delivers the stuff after the bands are cut onto the apron 20, and on this latter apron the stuff is separated and spread out as it moves to the machine. For the purpose of thus distributing the stuff and delivering it to the machine in thin sheets, instead of in large bundles, I employ the following mechanism: 30 represents ribs on the apron 20. These ribs extend lengthwise of the apron, and are preferably made in sections, (see Figs. X and XVII,) each section consisting of a V-shaped (in cross-section) piece of metal of the desired length. These sections are riveted to cross-strips 31, secured to the apron 20, (see Fig. XVII,) and lap onto each other. (See Fig. X.) The central and the two outside ribs are preferably higher than the intermediate ones, as shown in Figs. I, IV, and V. The apron travels so as to carry them in the direction indicated by the arrow in Fig. X, so that their outer ends 32 do not engage but will slip under the straw. By making these ribs in sections they do not interfere with the belt turning around its supporting-drums 33, while still they can be made sufficiently high to offer the desired resistance to the straw moving transversely on the apron.

Over the apron are arranged agitating-rakes consisting of transverse strips 34, supported by fitting in slots made in longitudinal bars 35, supported on the frame 16. (See Figs. I, III, IV and VIII.) Depending from the strips 34 are teeth 36, arranged so as to swing in one direction only. (See Fig. IX.) When the machine is in operation, the strips 34 have a vibratory movement imparted to them, so that they are constantly moving back and forth transversely of the apron 20. The apron itself has also this movement imparted to it, and the result is that the stuff is evenly distributed over the belt. The teeth 36 fold, as shown in dotted lines, Fig. IX, as the strips move in the direction of the bundles, and then as they move in the other direction the teeth pull the bundles apart, the ribs on the apron acting as a resistance to the movement of the straw. The drums 33, that carry the apron 20, are loosely mounted on their supporting-shafts 37, but are caused to turn with the shafts by feather and groove or other suitable connection. (See Fig. XI.) The drums can thus be moved back and forth (to give the movement to the apron.) This movement is imparted to the apron and agitating-rakes by lever 38, (see Figs. III, IV, and XIII,) pivoted at 39 to the frame 16. The upper end of the lever is connected to a bar 40 by means of a link 41, and the bar 40 is made fast to all of the strips 34. The lower end of the lever is connected to a bar 42 by a link 43, and this bar is made fast to the drums 33. (See Fig. II.) I have shown and prefer to use two of these levers with their links, and each lever is provided with a projection 44, to which is connected the upper end of a link 45 on a crank-shaft 46, journaled in brackets 47, secured to the frame 16. It will thus be seen that as the shaft 46 is turned the described movement will be imparted to the rakes and apron. The cranks of the shaft, to which the links are connected, are shown in Fig. II. The shaft 46 is turned by having bevel-gear connection 50 with one of the shafts 37. (See Figs. I and II.) The drums 33 are turned by one of their shafts 46, having pinion connection 51 (see Fig. II) with the shaft 15. The bars 35 are connected to the frame 16 by clamps 53, (see Fig. IV,) which afford the vertical adjustment of the rakes.

With a machine thus constructed the stuff is fed to the thrasher evenly and uniformly and the bands automatically cut.

I claim as my invention—

1. The combination of the apron having transverse slats and the longitudinal ribs formed of sections mounted on the respective apron-slats and overlapping to form continuous ribs, substantially as and for the purpose set forth.

2. In a band-cutter and feeder, the combination of the carrying-apron and the independent self-adjusting rotary cutters secured to operating-shafts and arranged on frames 22, and independent means for driving their respective shafts, substantially as and for the purpose set forth.

3. In a band-cutter and feeder, the combination of an apron 20, having longitudinal ribs 30, formed of overlapping sections, and means for supporting and operating the apron, substantially as set forth.

4. In a band-cutter and feeder, the combination of the vibratory rake, the vibratory apron, and means for vibrating the apron and rake simultaneously in opposite directions, substantially as and for the purpose set forth.

5. In a band-cutter and feeder, the combination of a carrying-apron provided with longitudinal ribs, a vibratory rake arranged over the apron, and means for moving the apron and rake, substantially as and for the purpose set forth.

6. In a band-cutter and feeder, the combination of a carrying-apron and rake arranged over the apron, and means for moving the rake, said rake consisting of strips provided with teeth hinged to fold in one direction only and when moved toward the center, substantially as and for the purpose set forth.

7. In a band-cutter and feeder, the combination of a carrying-apron and rake arranged over the apron, means for moving the apron and rake, consisting of a pivoted lever connected by its opposite ends to the rake and apron, respectively, a crank-shaft, and links connecting the cranks to the shaft, with projections on the levers, substantially as and for the purpose set forth.

8. In a band-cutter and feeder, the combination of a carrying-apron, drums over which the apron passes, shafts upon which the drums are mounted, so as to move endwise, a rake arranged over the apron and adapted to move endwise, and the double bell-crank lever having its respective ends connected to the drum and rake, substantially as described, for moving the apron and rake, substantially as and for the purpose set forth.

9. In a band-cutter and feeder, the combination of a traveling apron with cutters supported above the apron, said cutters being composed of two or more sections having independent vertical yieldance, substantially as and for the purpose set forth.

GODFREY H. LASAR.

In presence of—
   EDW. S. KNIGHT,
   THOMAS KNIGHT.